Feb. 17, 1931.  O. T. BLÁTHY  1,793,434
ELECTRIC MACHINE
Filed Feb. 11, 1928  3 Sheets-Sheet 1
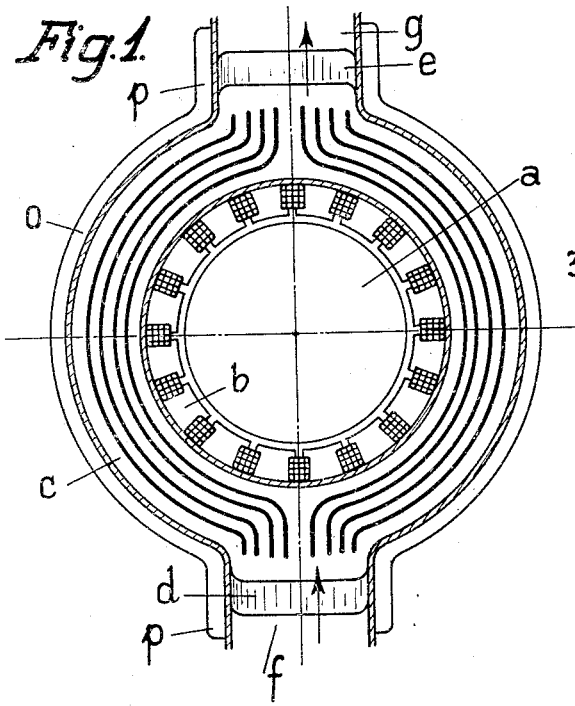
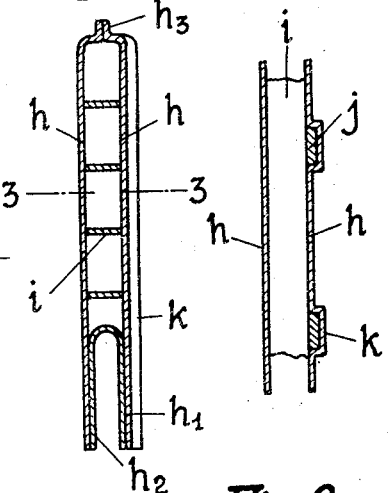
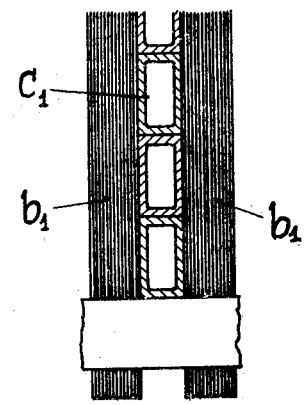
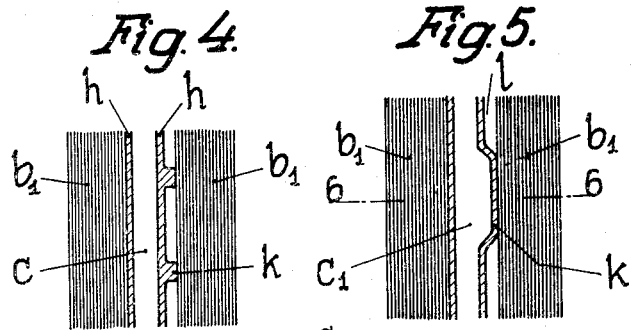
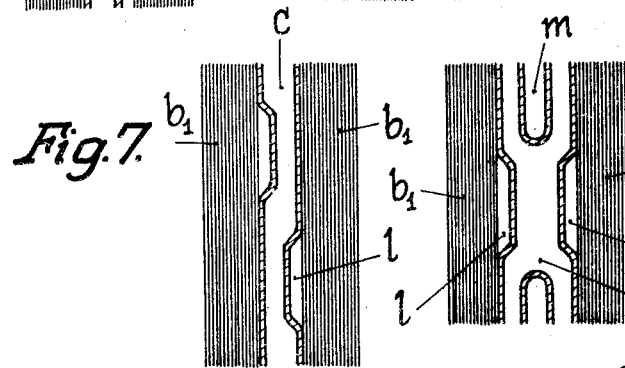
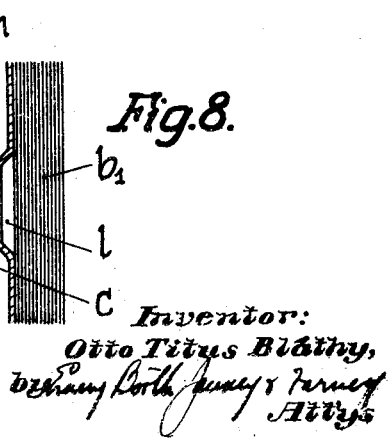
Inventor:
Otto Titus Bláthy,
by [signature] Attys

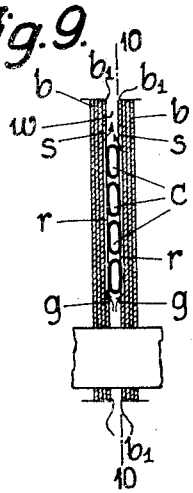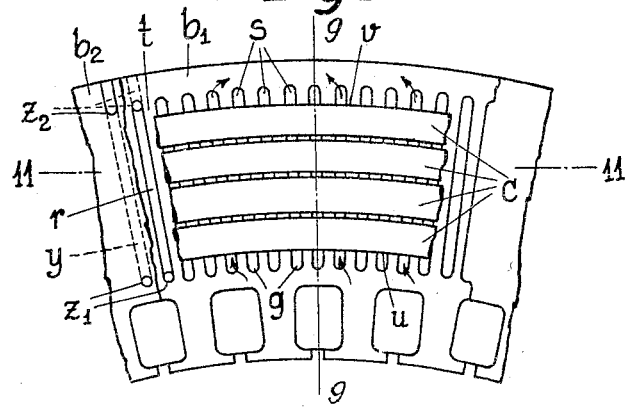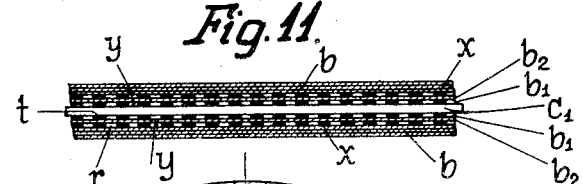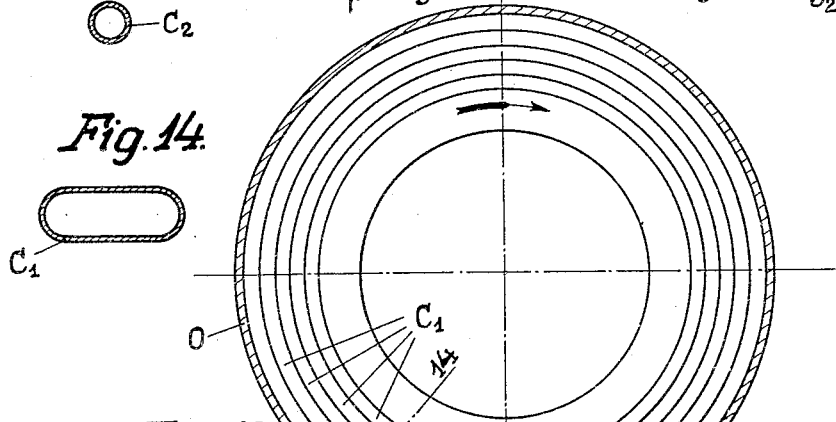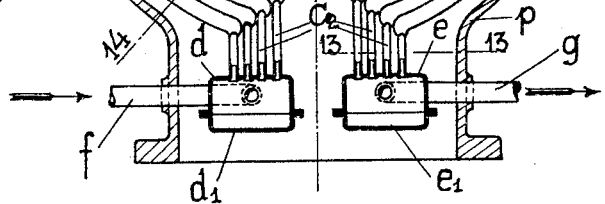

Inventor:
Otto Titus Bláthy.
by Emery Booth, Janney & Varney
Attys.

Patented Feb. 17, 1931

1,793,434

UNITED STATES PATENT OFFICE

OTTO TITUS BLÁTHY, OF BUDAPEST, HUNGARY

ELECTRIC MACHINE

Application filed February 11, 1928, Serial No. 253,697, and in Hungary and Germany February 23, 1927.

This invention relates to cooling arrangements for electrical machines wherein both liquid and air are employed as cooling agents.

The primary object of the invention is to provide for the stator a liquid-cooling arrangement which constitutes at the same time efficient cooling means for the air cooling the rotor. Another object of the invention is to enable the cooling air to complete its circulation within the machine. A further object of the invention is to make the amount of cooling air conducted in a closed circuit through the machine as small as possible, thereby reducing the damage in case of fire to a minimum. A still further object of my invention is to provide a combined cooling arrangement of the type referred to which will as little as possible interfere with the active length of the stator body.

With the above objects in view I arrange, between the individual groups of laminations of the stator iron, liquid-cooling elements as well as air ducts or passages so that the warm air emerging from the rotor enters such air gaps and during its passage through them gives up its heat which is removed, together with the heat arising in the stator, by the liquid-cooling elements. It will be understood that in addition to such air-cooling, liquid-cooling may be employed also for the rotor.

Liquid-cooling elements and air ducts may be arranged in alternate spaces between the individual groups of laminations. In this case however the heat taken from the cooling air must be transmitted through the full thickness of the group of laminations to be cooled so that not to exceed the admissible temperature fall the groups of laminations must be made comparatively thin and the cooling elements arranged comparatively close together; this can only be achieved at the expense of the length of the active iron of the stator body.

An alternative consists in the arrangement of the air ducts in the interior of the cooling elements so that the warm cooling-air from the rotor comes in direct contact with the cooling elements. Even this arrangement, however, has its disadvantages since firstly the thickness of the cooling elements in the axial direction is substantially increased and secondly the manufacture of such elements is attended by difficulties.

The best solution of the problem is to arrange the air ducts between the cooling elements and the stator iron, to be cooled and to provide for said stator iron being in conductive contact with said elements.

Several examples of cooling devices embodying the present invention are illustrated in the accompanying drawing in which:

Fig. 1 is a diagrammatic cross section of a machine provided with a cooling arrangement according to the invention.

Fig. 2 is a radial section, to a larger scale of a cooling element.

Fig. 3 is a section on the line 3—3 of Fig. 2.

Figs. 4 and 5 are sections, similar to Fig. 3, of modified forms of cooling elements.

Fig. 6 is a radial section of the cooled stator iron on the line 6—6 of Fig. 5.

Figs. 7 and 8 are views, similar to Figs. 3—5 of further modifications of the cooling elements.

Fig. 9 is a longitudinal section according to line 9—9 of Fig. 10 of a part of the stator iron, showing a further modification of simple construction and great efficiency.

Fig. 10 is a cross-section on line 10—10 of Fig. 9.

Fig. 11 is a section on the line 11—11 of Fig. 10, showing a modified arrangement to be seen also in the left hand side portion of Fig. 10.

Fig. 12 is a diagrammatic cross-section of a machine, showing a preferred modification of the attachment for the cooling tubes.

Figs. 13 and 14 are cross-sections to a larger scale on the lines 13—13 and 14—14 respectively of Fig. 12.

Figure 15:
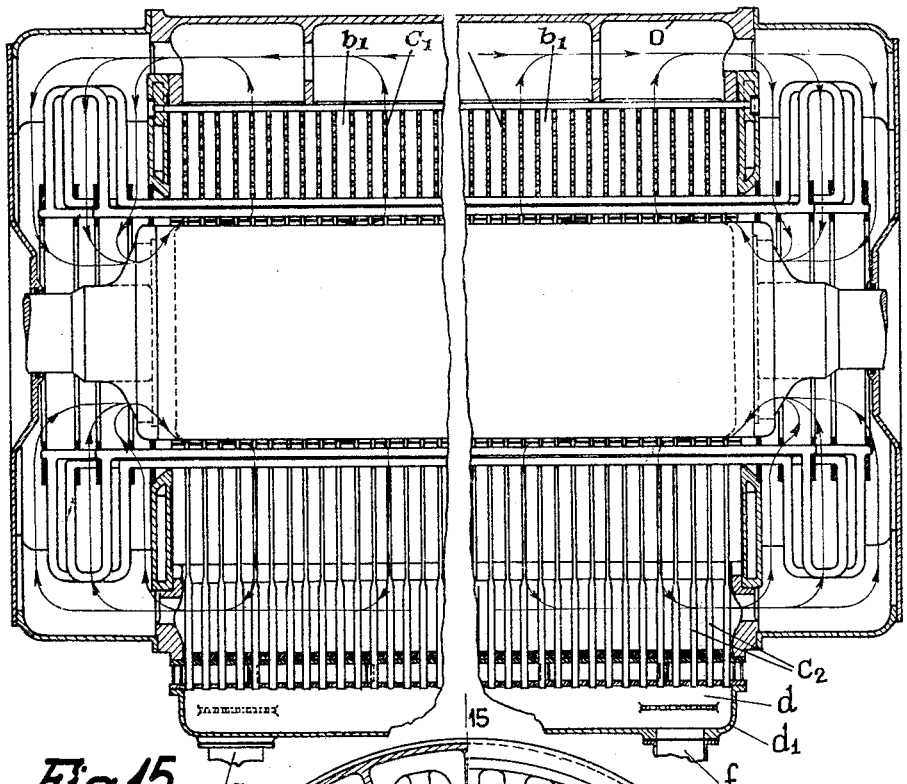
Figure 16:
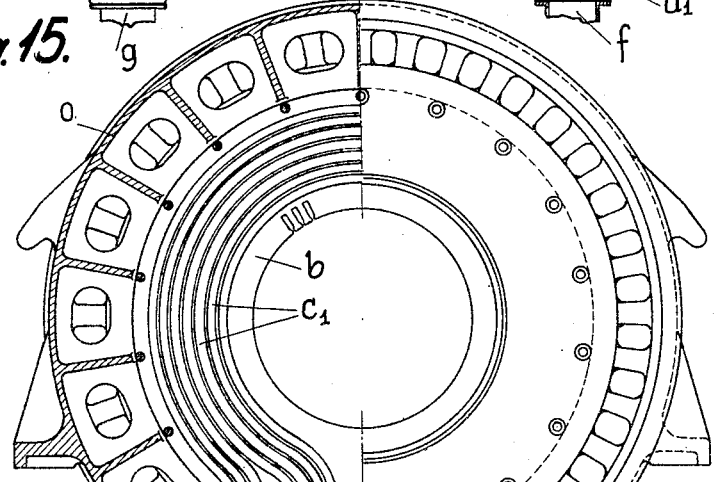

Fig. 15 is a longitudinal section of the machine provided with a cooling corresponding to diagrammatic Fig. 12 and Fig. 16 is a cross section on line 15—15 of Fig. 15.

Referring to Fig. 1 of the drawings the reference letter $a$ indicates the rotor of an electrical machine and $b$ the stator the iron body of which is composed of separate groups of laminations. Hollow cooling elements $c$ which have the shape of flattened rings and in cross section are of the form, for example, illustrated in Fig. 2, are interposed between the separate groups of laminations. Said cooling elements communicate at two or more points with distributing and collecting conduits $d$, $e$ connected to inlet and outlet pipes $f$ and $g$ respectively. Cooling water enters at $f$, is conveyed through the distributing passages $d$ to the individual cooling elements $c$, flows through these and through the collecting passages $e$ to the outlet $g$, there either to be discharged or to be fed once more in continuous circulation through a cooler to the inflow pipe $f$. With closed circulation distilled water, for example condensation water from a steam plant, may be used advantageously for the cooling. The cooling elements illustrated in Figs. 2 and 3 are composed of two pressed sheet-metal laminations $h$, $h$ which are welded together at the flange $h_3$. At the inner circumference the laminations $h$ may be furnished with extensions $h_1$ cut out to correspond with the teeth of the stator iron and welded or soldered with the correspondingly toothed, U-shaped ring insertion $h_2$. The insertions $i$ which are arranged concentrically, as illustrated in Fig. 1, are provided to give stiffening against axial pressure. The relative positions of these insertions $i$ may be determined by welded radial ribs $j$ which are located in recesses (Fig. 3) in the lateral walls $h$ of the cooling element. In this way ribs are formed which on the one hand effect the conduction of the heat from the stator iron to the cooling elements and on the other hand cause air ducts or passages to be formed between the cooling elements and the stator iron; the cooling air from the rotor flows through said ducts and gives up its heat so that the cooling air may be returned in closed circulation directly into the rotor without leaving the housing of the machine. As a result of this arrangement, in addition to the extremely efficient cooling of the stator, such cooling of the rotor cooling air is attained as to make the quantity of air in the interior of the housing sufficient for the rotor cooling. The quantity of circulating cooling air, cut off from the outside air, is then so inconsiderable that on the occurrence of fire in the machine the air present is used up before any great damage can occur.

Fig. 4 is a section, similar to Fig. 3, of a modified arrangement wherein the elements interposed between the groups $b_1$, $b_1$ of laminations are provided with cast-on ribs $k$ whereby airducts $l$ are formed between the stator iron $b_1$ to be cooled and the walls $h$ of the cooling element.

Figs. 5 and 6 illustrate a construction in which the cooling elements are formed from a plurality of flat tubes $c_1$ which have a cross-sectional shape approximately that of a parallelogram. The ribs $k$ are formed by recesses in the tubes.

In the examples illustrated in Figs. 2 to 3 the air ducts formed between the ribs $k$ are located on one side of the cooling element while on the other side the cooling element is in direct contact with the stator iron over its entire extent.

In all the modifications described it is possible with advantage to provide the ribs $k$ on both sides of the cooling element.

In the arrangement illustrated in Fig. 7 the recesses or ribs $k$ are located alternately on either side of the tubes $c_1$.

Fig. 8 shows an alternative construction wherein cooling passages $m$ for the air are carried through the centre of the cooling element $c$. As is clear from the figure this arrangement is less suitable than those preceding since the thickness of the cooling element in the axial direction of the machine is increased due to the air passages located in the interior of the cooling element.

In the modification shown in Figs. 9 and 10, the cooling surface presented to the cooling air is considerably increased. The reference letters $b$, $b$ indicate two neighbouring groups of stator laminations between which the water cooled cooling elements $c$ are located consisting, for example, of a plurality of concentric annular tubes of flattened cross-section. The stator laminations $b$, $b$ adjacent the cooling elements $c$ are furnished with radial slots $r$ separated by intermediate portions of lamination $t$. Said portions $t$ abut against the cooling elements $c$ and provide for the heat-conduction between the rest of the stator iron and said cooling elements. The slots $r$ are so long that they project at both ends beyond the inner and outer limits or edges $u$ and $v$ respectively, of the cooling element $c$. Openings $q$ are thus formed for the entry of the air current flowing in the direction of the arrow through the machine. The warm air entering by the openings $q$ passes along the passages formed by the slots $r$, is efficiently cooled therein and enters a gap $w$ between the two groups $b$, $b$ of laminations by the openings $s$, leaving the stator through said gap; it then flows in a cooled condition back to the parts of the machine to be cooled. The air passages formed by the slots $r$ are bounded on the one hand by the unslotted laminations of the stator iron and on the other hand by the cooling elements $c$. Since the groups of laminations $b$ are in direct heat-conductive connection, through the intermediary of the thin connecting portions or ribs $t$, with the cooling elements, said groups of laminations are well cooled and the air to be cooled thus contacts with cold walls.

In the modification illustrated in Fig. 11 and the left hand side of Fig. 10, good heat-conducting, metallic spacing ribs $x$ are disposed radially between the stator laminations $b_2$ bounding the air passages $r$ adjacent the cooling element $c$ and the remaining stator laminations $b$. Between these ribs $a$ radial air gaps $y$ are formed which are bounded on all sides by well cooled walls. The ribs $a$ may also be stamped up from the next lamination, adjacent the unslotted lamination $b_2$, which is then of exactly the same form as the first lamination $b_1$. Round holes $z_1$ and incisions $z_2$ which communicate with the inner and outer ends respectively of the radial slots $r$ are stamped out from the lamination $b_2$ located between the two laminations furnished with said radial slots. Consequently the air entering at $q$ flows only in part through the gaps $r$, the other part passing through the holes $z_1$ into the gaps $y$ to emerge from the stator iron at the outer ends of these gaps through the incisions $z_2$. Naturally several stator laminations may also be provided alternately with slots $r$ and holes $z_1$ and slits $z_2$. The air gaps $r$, $y$ thus being distributed in two planes, the surface for the transmission of heat between iron and air is doubled.

When the cooling elements comprise several concentric tubes or passages, the latter may be connected at their ends to the distributing and collecting conduits in such a manner that any tubes which have become leaky may be cut out individually.

Fig. 12 illustrates a very suitable arrangement for this purpose.

The individual cooling elements consist of tubes $c_1$ which project from the active stator iron to be cooled. At their ends, $c_2$ they have a circular cross-section (Fig. 13) whereas in the part situated between the groups of laminations of the stator they are pressed flat (Fig. 14) in substantially the manner illustrated in Fig. 6.

The ends $c_2$ of the cooling tubes are fitted in holes in the tops of the box-shaped distributing and collecting conduits $d$ and $e$ communicating with the inlet $f$ and outlet $g$ respectively. After the removal of the bottom covers $d_1$ and $e_1$ of the distributing and collecting conduits respectively the mouths of the damaged cooling tubes may be closed by means of any appropriate stopping means.

In the arrangement illustrated in Fig. 1 the entry and outlet of the cooling liquid occur at two diametrically opposite points on the stator. This arrangement may however be modified by passing the water around the stator, not through an angle of 180°, but through a larger arc and if occasion demand, around the entire circumference of the stator as shown in Figs. 12 and 16, in which case the entry and outlet for the cooling liquid would be located, say, at the lowest point in the stator housing. Naturally the cooling elements may also consist of shorter segments.

In order to reduce the air capacity of the machine housing to a minimum, said housing is, as is clear from Figs. 1 and 12 and 16, provided with recesses $p$ to receive the connecting, collecting and distributing pipes, the number of such recesses depending upon the particular arrangement of these parts employed.

Having now particularly described and ascertained the nature of my said invention and in what manner the same is to be performed, I declare that what I claim is:

1. An electrical machine comprising a rotor, a stator with an iron body composed of a plurality of groups of laminations, a plurality of liquid-cooling elements each interposed between two of said groups of laminations and so formed as to have thermally conductive contact therewith, distributing and collecting conduits in communication with the end of said liquid-cooling elements, a machine housing provided with radial projections forming recesses to accommodate the ends of said liquid-cooling elements as well as said distributing and collecting conduits, and said liquid-cooling elements shaped to form a plurality of substantially radial air ducts between said liquid-cooling elements and said groups of laminations to receive the warm air emerging from the rotor.

2. An electrical machine comprising a rotor, a stator with an iron body composed of a plurality of groups of laminations, a plurality of liquid-cooling elements each interposed between two of said groups of laminations and so formed as to have thermally conductive contact therewith, and each consisting of several concentric passages, distributing and collecting conduits in communication with the ends of each of said concentric passages, means affording access to the ends of each of said concentric passages to enable them to be cut off individually from said distributing and collecting conduits and said liquid-cooling elements shaped to form a plurality of substantially radial air ducts distributed between said liquid-cooling elements and said groups of laminations to receive the warm air emerging from the rotor.

3. Electrical machine comprising a rotor, a stator with an iron body composed of a plurality of groups of laminations, a plurality of liquid-cooling elements each interposed between two of said groups of laminations and so formed as to have thermally conductive contact therewith, and each consisting of several concentric passages, distributing and collecting conduits in communication with the ends of each of said concentric passages, means affording access to the ends of each of said concentric passages to enable them to be cut off individually from said distributing and collecting conduits, a machine housing provided with radial projections forming recesses to accommodate the ends of said liquid-cooling elements as well as said distributing and collecting conduits and said liquid-cooling elements shaped to form a plurality of substantially radial air ducts distributed between said liquid cooling elements and said groups of laminations to receive the warm air emerging from the rotor.

4. In an electrical machine comprising a rotor and a stator with an iron body composed of a plurality of groups of laminations, the combination with a plurality of liquid-cooling elements each so interposed between two of said groups of stator laminations and so formed as to have thermally conductive contact therewith, of a plurality of substantially radial air ducts bounded on the one hand by said liquid-cooling elements and on the other by said stator iron body and formed by radial slots cut in the stator laminations adjacent said cooling elements so as to extend beyond both the inner and outer limits of the latter.

5. In an electrical machine comprising a rotor and a stator with an iron body composed of a plurality of groups of laminations, the combinations with a plurality of liquid-cooling elements each so interposed between two of said groups of stator laminations and so formed as to have thermally conductive contact therewith, of a plurality of substantially radial air ducts located between said cooling elements and said groups of stator laminations so as to be bounded on the one hand by said cooling elements and on the other by said stator iron body and adapted to receive the warm air emerging from said rotor and conduct it in direct contact with said liquid-cooling elements through said stator, thermally conductive spacing ribs being provided between such stator laminations as bound said air gaps and the remaining laminations of the group.

6. In an electrical machine comprising a rotor and a stator with an iron body composed of a plurality of groups of laminations, the combination with a plurality of liquid-cooling elements each so interposed between two of said groups of stator laminations and so formed as to have thermally conductive contact therewith, of a plurality of substantially radial air ducts located between said cooling elements and said groups of stator laminations and formed by radial slots cut in the stator laminations adjacent said cooling elements so as to extend beyond the inner and outer limits of the latter, holes registering with the inner ends, and incisions partly registering with the outer ends of said radial slots being cut in the next laminations, and such radial slots alternating with such holes and incisions in subsequent laminations.

7. An electrical machine comprising a rotor, a stator, with an iron body composed of a plurality of groups of laminations, a plurality of liquid-cooling elements each so interposed between two of said groups of laminations and so formed as to have thermally conductive contact therewith, and each consisting of several concentric passages of a flattened cross-section in the portion located between the stator laminations and of circular cross-section in the end portions projecting from the laminations, distributing and collecting conduits in communication with the circular ends of each of said concentric passages, means affording access to said circular ends of each of said concentric passages to enable the latter to be individually cut off from said distributing and collecting conduits, and a plurality of substantially radial air ducts distributed between said groups of laminations to receive the warm air emerging from the rotor.

8. An electrical machine comprising a rotor, a stator with an iron body composed of a plurality of groups of laminations, a plurality of liquid cooling elements each so interposed between two of said groups of laminations and so formed as to have thermally conductive contact therewith, and each consisting of several concentric passages, box-shaped distributing and collecting conduits having an inner wall provided with perforations to receive the ends of each of said concentric passages, and an outer removable cover opposite to said inner wall, and said liquid-cooling elements shaped to form a plurality of substantially radial air ducts distributed between said groups of laminations to receive the warm air emerging from the rotor.

9. An electrical machine comprising, in combination, a rotor, a stator with an iron body composed of a plurality of groups of laminations, means providing a cooler for the stator iron and air from the rotor, comprising liquid conducting conduits between the groups of stator laminations in thermal conducting contact therewith, said conduits shaped to form air passages between said conduits and the walls of said groups of laminations for the air from the rotor, whereby liquid flowing through said conduits is effective to cool said laminations and said air.

10. An electrical machine comprising, in combination, a rotor, a stator with an iron body composed of a plurality of groups of laminations, means providing a cooler for the stator iron and air from the rotor, comprising liquid conducting conduits between the groups of stator laminations in thermal conducting contact therewith, said conduits shaped to form radial air passages at both lateral sides thereof between said conduits and the walls of said groups of laminations for the air from the rotor.

11. An electrical machine comprising, in combination, a rotor, a stator with an iron body composed of a plurality of groups of laminations, means providing a cooler for the stator iron and air from the rotor, comprising a plurality of liquid conducting conduits between the groups of stator laminations in thermal conducting contact therewith distributing and collecting conduits for said liquid conducting conduits, said liquid conducting conduits shaped to form air passages between said conduits and the walls of said groups of laminations for the air from the rotor, whereby liquid flowing through said conduits is effective to cool said laminations and said air.

In testimony whereof I affix my signature.

OTTO TITUS BLÁTHY.